United States Patent [19]
Shingu et al.

[11] Patent Number: 6,008,790
[45] Date of Patent: *Dec. 28, 1999

[54] IMAGE PROCESSING APPARATUS

[75] Inventors: Toshiaki Shingu, Kawasaki; Akiyoshi Hamanaka, Hachioji, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/690,389

[22] Filed: Jul. 26, 1996

[30] Foreign Application Priority Data

Jul. 31, 1995 [JP] Japan .................................. 7-194942
May 31, 1996 [JP] Japan .................................. 8-138339

[51] Int. Cl.$^6$ ........................................................ H04N 7/01
[52] U.S. Cl. .............................. 345/116; 345/98; 345/112; 348/441; 348/443; 348/459
[58] Field of Search ............................ 345/98, 99, 112, 345/132, 213, 116; 348/441, 459, 699, 700, 412, 415, 443, 447, 454, 619, 620, 430; 395/118, 133, 135, 501

[56] References Cited

U.S. PATENT DOCUMENTS

| | | | |
|---|---|---|---|
| 4,322,750 | 3/1982 | Lord et al. ............................... | 348/443 |
| 4,587,556 | 5/1986 | Collins ..................................... | 348/443 |
| 4,872,054 | 10/1989 | Gray et al. .............................. | 348/441 |
| 4,987,485 | 1/1991 | Hirota ...................................... | 358/516 |
| 5,166,792 | 11/1992 | Lyon ........................................ | 348/441 |
| 5,191,416 | 3/1993 | Dickson et al. ......................... | 358/140 |
| 5,276,506 | 1/1994 | Fujita ....................................... | 348/578 |
| 5,295,199 | 3/1994 | Shino ....................................... | 345/425 |
| 5,303,045 | 4/1994 | Richards et al. ........................ | 348/443 |
| 5,404,170 | 4/1995 | Keating .................................... | 348/443 |
| 5,446,496 | 8/1995 | Foster et al. ............................. | 348/441 |
| 5,521,636 | 5/1996 | Nakayama et al. ..................... | 348/222 |
| 5,543,861 | 8/1996 | Harradine et al. ...................... | 348/718 |
| 5,657,042 | 8/1997 | Inoue et al. ............................. | 345/100 |

*Primary Examiner*—Matthew Luu
*Assistant Examiner*—Vincent E. Kovalick
*Attorney, Agent, or Firm*—Fitzpatrick, Cella, Harper & Scinto

[57] ABSTRACT

There is provided an image processing apparatus which comprises an input unit for inputting image data at a first frame rate, and a processing unit for providing a residual image effect to the image data input by the input unit using adjacent image data adjacent to the image data, and in which the processing unit comprises an output unit for outputting the processed image data at a second frame rate.

There is also provided an image processing apparatus which comprises an input unit for inputting image data, a processing unit for providing a residual image effect to the image data input by the input unit using adjacent image data adjacent to the image data, and a display unit for displaying the image data processed by the processing unit, and in which the display frequency of the display unit is lower than the frequency of the image data input by the input unit.

18 Claims, 8 Drawing Sheets

IMAGE PROCESSING APPARATUS

BACKGROUND OF THE INVENTION

1. Field of the Invention

The present invention relates to an image processing apparatus and, more particularly, to residual image effect processing for input image data.

2. Related Background Art

Figure 1:
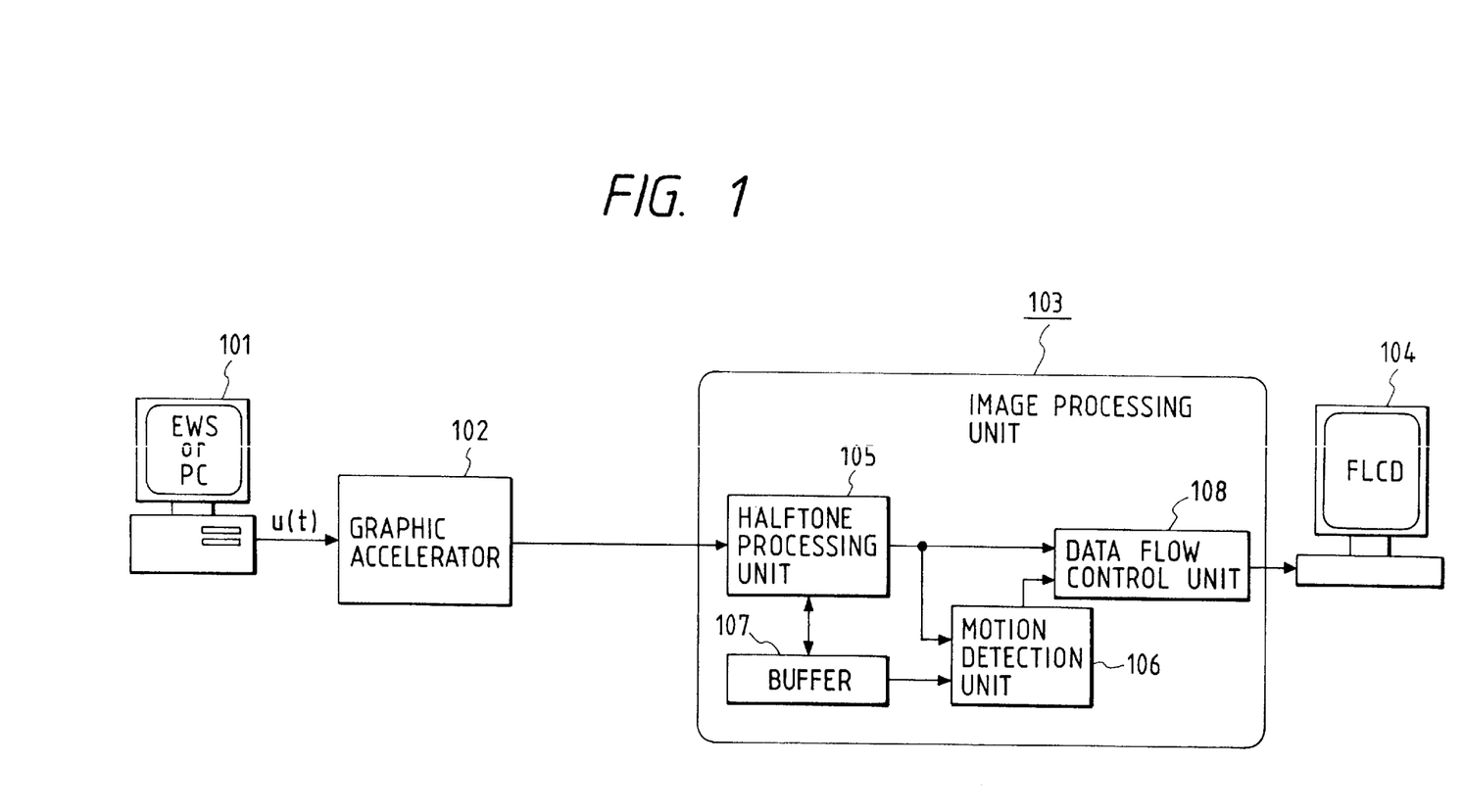
FIG. 1 is a block diagram showing the arrangement of a conventional image processing system.

Conventionally, an image processing system shown in FIG. 1 is used when image data which is sent from, e.g., a computer at a predetermined transfer rate (frequency) is to be displayed on a display device such as a liquid crystal display device which has an upper limit of the frame display frequency lower than the transfer rate.

Referring to FIG. 1, the image processing system comprises a workstation (EWS) or personal computer (PC) 101 (to be referred to as a PC 101 hereinafter), a graphic accelerator 102 compatible with the image output of the PC 101, an image processing unit 103, and a liquid crystal display device 104 (a ferroelectric liquid crystal device (FLCD) in this case).

Since the FLCD has a memory function of holding a displayed image for a predetermined period of time after the image is displayed, it can display an image by rewriting only an updated portion of image data on the display screen.

The image processing unit 103 includes a halftone processing unit 105 for performing halftone processing for image data output from the graphic accelerator 102, a motion detection unit 106 for detecting motions of the image data subjected to the halftone processing, a buffer 107 used in the processing of the halftone processing unit 105 and the motion detection unit 106, and a data flow control unit 108 for outputting an image signal subjected to the halftone processing in accordance with the motion detection information from the motion detection unit in correspondence with the frame display frequency of the display device 104.

The operation of the image processing system with the above-mentioned arrangement will be described below.

Digital image data u(t) input from the PC 101 at time T=t is input to the image processing unit 103 via the graphic accelerator 102.

In the image processing unit 103, the digital image data is subjected to processing for halftone expression in the halftone processing unit 105 using the buffer 107. The processed digital image data is input to both the data flow control unit 108 and the motion detection unit 106. The motion detection unit 106 obtains motion detection information by detecting any motions of an image using image data of the previous frame stored in the buffer 107.

The data flow control unit 108 supplies the input image data to the display device 104 in accordance with the motion detection information. At this time, image data input from the data flow control unit 108 to the display device 104 is only that of a portion, in which the presence of a motion in one frame is detected by the motion detection unit 106.

However, when the frequency (transfer rate) of the input image data is higher than the upper limit of the display frequency of the display device 104, the amount of image data, in which the presence of motions is detected by the motion detection unit 106, and which must be rewritten may exceed the amount of data which can be rewritten by the display device 104 within a predetermined period of time. In this case, the data flow control unit 108 thins out input image data of the subsequent frames until the rewriting operation of the currently rewritten frame is safely completed, thereby avoiding the image displayed on the display device 104 from being destroyed.

However, with the above-mentioned conventional method, when the frequency of image data sent from a computer is higher than the display frequency of the display device, frame data are thinned out at irregular periods. For this reason, when a dynamic image signal is to be displayed on a display device having a display frequency lower than the frequency of input image data, the dynamic image displayed moves frame by frame, resulting in poor smoothness of motions.

SUMMARY OF THE INVENTION

The present invention has been made in consideration of the above situation, and has as its object to provide an image processing apparatus which can smoothly display a dynamic image even on a display apparatus which has a display frequency different from the frequency (transfer rate) of input image data.

In order to achieve the above object, according to one preferred aspect of the present invention, an image processing apparatus comprises input means for inputting image data at a first frame rate, and processing means for providing a residual image effect to the image data input by the input means using adjacent image data adjacent to the image data, and the processing means comprises output means for outputting the processed image data at a second frame rate.

According to one preferred aspect of the present invention, an image processing apparatus comprises input means for inputting image data, processing means for providing a residual image effect to the image data input by the input means using adjacent image data adjacent to the image data, and display means for displaying the image data processed by the processing means, and the display frequency of the display means is lower than the frequency of the image data input by the input means.

Other objects, features and advantages of the invention will become apparent from the following detailed description taken in conjunction with the accompanying drawings.

DETAILED DESCRIPTION OF THE PREFERRED EMBODIMENTS

An embodiment to be described below will exemplify an apparatus for smoothly displaying a dynamic image signal when dynamic image data, which has a transfer rate of input image data higher than the display frequency of a display device, is to be displayed on the display device.

In the following description of this embodiment, an FLCD having a memory function will be taken as an example of the display device.

The embodiment of the present invention will be described hereinafter.

Figure 2:
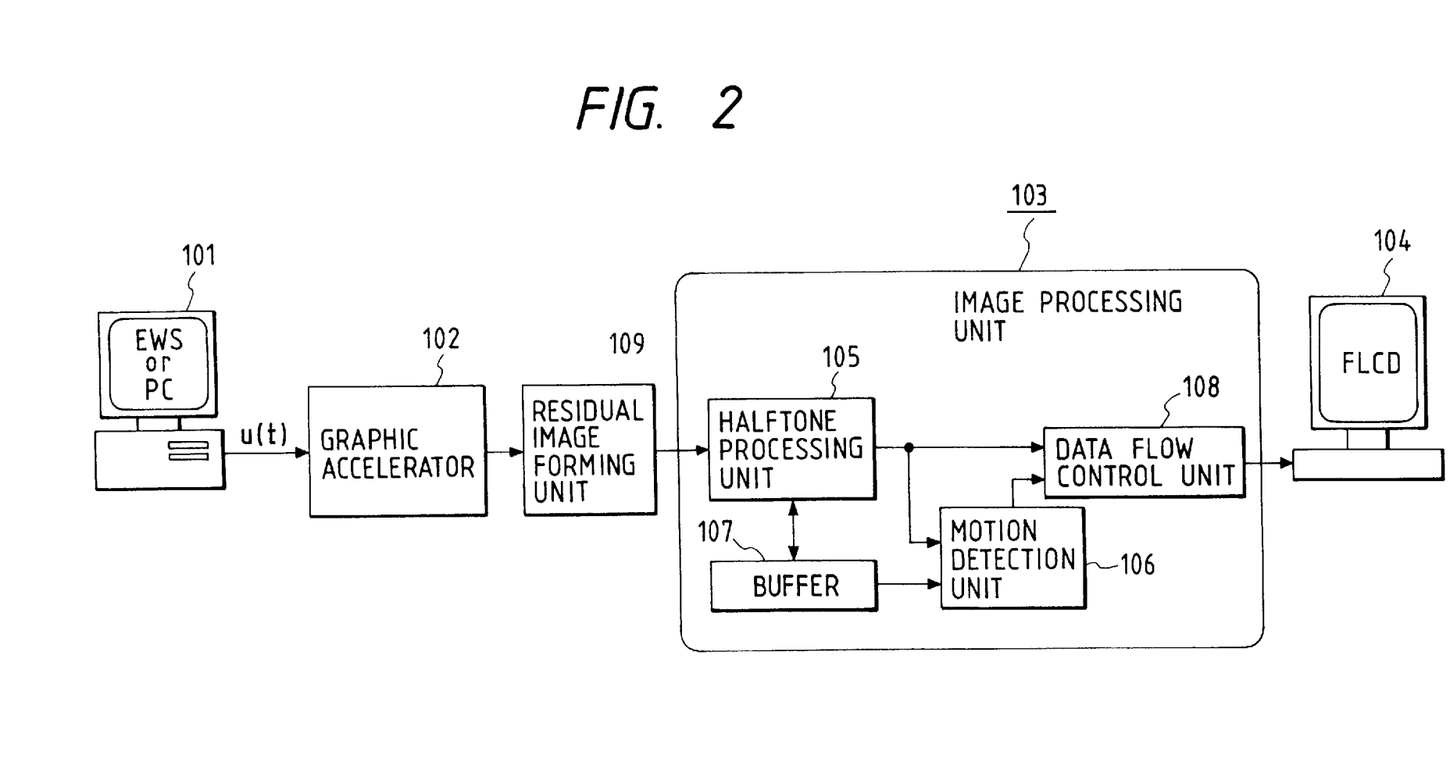
FIG. 2 is a block diagram showing the arrangement of an image processing system according to an embodiment of the present invention.

FIG. 2 is a block diagram showing the arrangement of an image processing system according to the embodiment of the present invention. Note that the same reference numerals in FIG. 2 denote the same parts as in FIG. 1, and a detailed description thereof will be omitted.

Referring to FIG. 2, a residual image forming unit 109 is arranged between a graphic accelerator 102 and an image processing unit 103.

Figure 3:
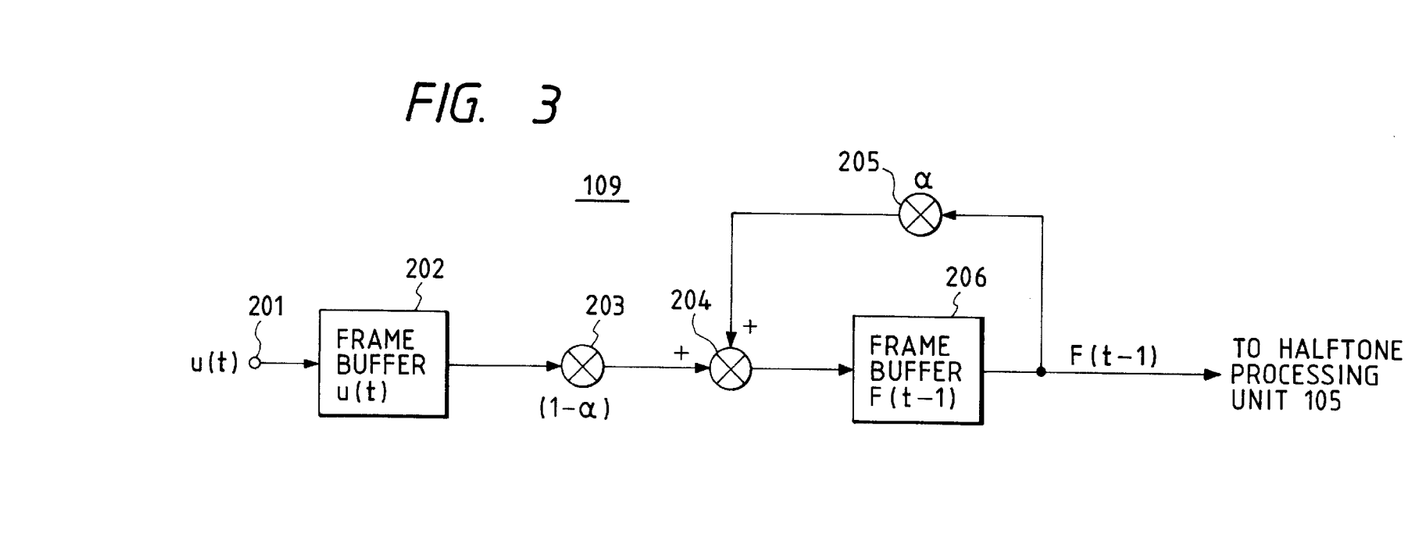
FIG. 3 is a block diagram showing the arrangement of a residual image forming unit 109 according to the first embodiment of the present invention.

FIG. 3 is a block diagram showing the arrangement of the residual image forming unit 109 according to the first embodiment of the present invention. Referring to FIG. 3, the unit 109 comprises an input terminal 201 of digital image data u(t), frame buffers 202 and 206, multipliers 203 and 205, and an adder 204.

The operation of the residual image forming unit with the arrangement shown in FIG. 3 will be described below.

Digital image data u(t) input from a PC 101 at time T=t is stored in the frame buffer 202 in the residual image forming unit 109 via the graphic accelerator 102.

The digital image data u(t) stored in the frame buffer 202 is sequentially read out and is multiplied with a coefficient (1−α) by the multiplier 203 (for 0≦α<1). The output (1−α) u(t) from the multiplier 203 is input to the adder 204, and is added to a display output (residual image signal) corresponding to input image data at time T=t−1. The sum data is stored in the frame buffer 206 as the latest display output.

The digital image data stored in the frame buffer 206 is read out at a rate corresponding to the frame rate (display frequency) of a display device 104 as a display output corresponding to the input signal at time T=t, and the readout data is input to the image processing unit 103 and the multiplier 205.

The display output corresponding to the input signal at time T=t input to the multiplier 205 is multiplied with a coefficient α, and the product data is input again to the adder 204. The data is added to a processing signal (1−α)u(t+1) corresponding to digital image data at time T=t+1 as a residual image signal. With this processing, a residual image can be added to the image data u(t) to be displayed, as shown in FIGS. 4A and 4B.

Figure 4A:
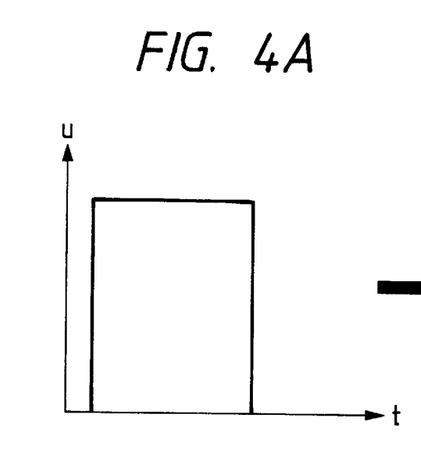
FIGS. 4A and 4B are charts showing examples of the time waveforms of input and output signals of the residual image forming unit in the first embodiment.
Figure 4B:
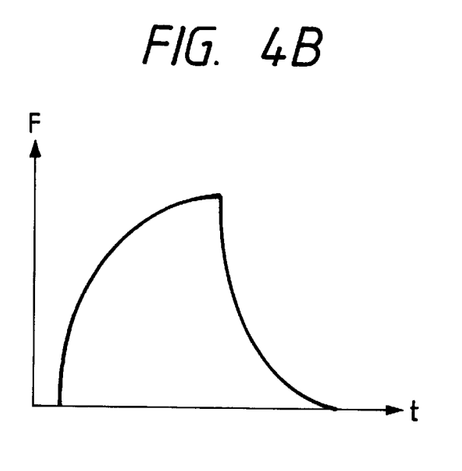

Referring to FIGS. 4A and 4B, when the value α increases (closer to 1), since the residual image to be added increases, both the leading and trailing edges of an output (FIG. 4B) with respect to input image data shown in FIG. 4A become slow, thus providing an effect of obtaining a smooth dynamic image. On the other hand, when the residual image to be added increases, spatial high-frequency components such as motion components of image data cancel each other, thus blurring the image.

In the display device 104 such as a liquid crystal display device in which the frequency of output (displayed) image data is lower than that of input image data (to be displayed), the dynamic image cannot have a smooth motion since frame data are thinned out due to a delay in the rewriting operation of a dynamic image. Therefore, in order to avoid this phenomenon, when the residual image amount of the residual image forming unit 109, i.e., the value α (0<α<1), is appropriately set to have a good balance between the visual smoothness of the motion of an image and the degree of blur of an image, a visually smoother dynamic image can be realized by adding the residual image (u(t)→F(t)). F(t) is given by:

$$F(t)=\alpha F(t-1)+(1-\alpha)u(t) \quad (1)$$

Upon a comparison between the time-level characteristics of $\alpha_1 < \alpha < \alpha_2$ and F(t), when $\alpha = \alpha_1$, the leading and trailing edges become steeper than those when $\alpha = \alpha_2$, and the amount of residual image to be added becomes smaller. As a result, blur of the image is small, but visual smoothness of the image cannot be improved sufficiently.

Note that the residual image forming unit of this embodiment sets an optimal coefficient α by recognizing the transfer rate (frequency) of input image data and the display frequency of the display device. The display frequency information of the display device can be input from the display device side to the residual image forming unit at a predetermined timing (e.g., upon power-ON).

The second embodiment of the residual image forming unit 109 will be described below.

Figure 5:
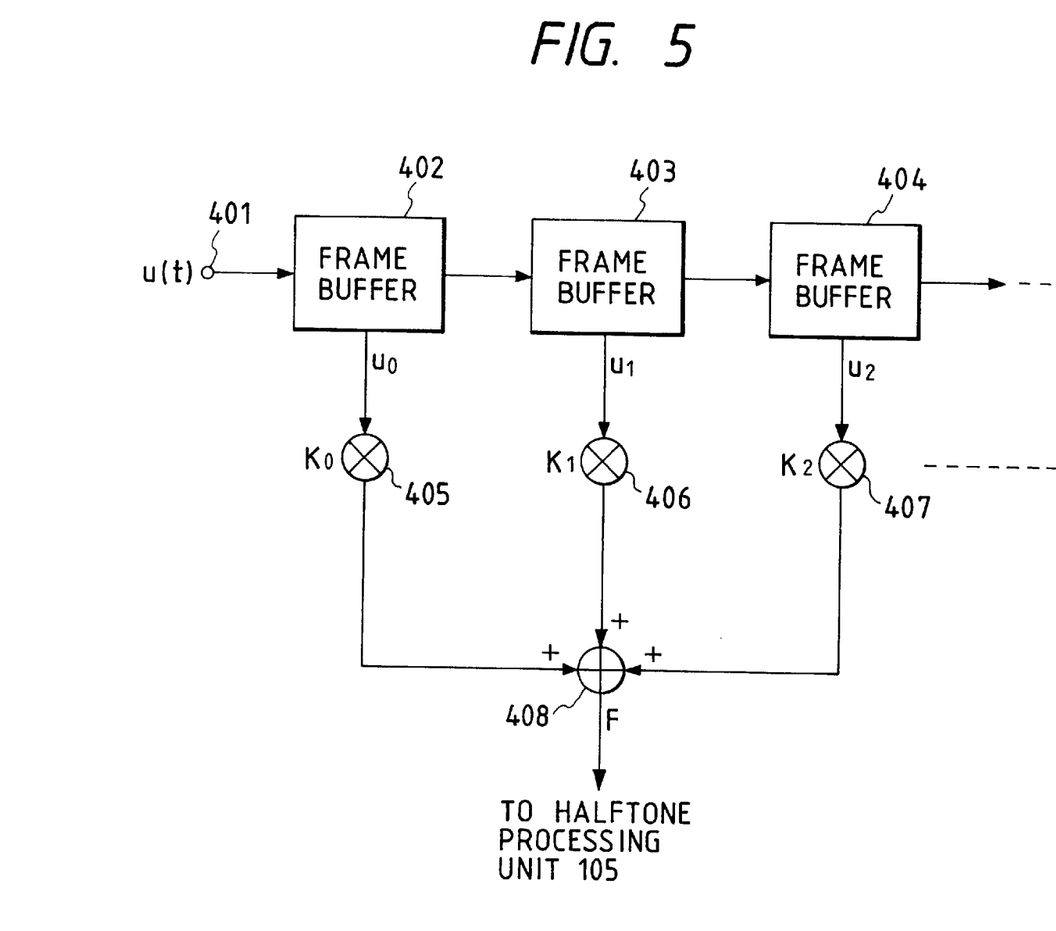
FIG. 5 is a block diagram showing the arrangement of a residual image forming unit 109 according to the second embodiment of the present invention.

FIG. 5 is a block diagram showing the arrangement of the residual image forming unit 109 according to the second embodiment of the present invention.

Referring to FIG. 5, the unit 109 comprises an input terminal 401 of digital image data u(t), frame buffers 402, 403, and 404, multipliers 405, 406, and 407, and an adder 408.

The operation of the residual image forming unit with the arrangement shown in FIG. 5 will be described below.

Digital image data u(t) input from the input terminal 401 at time T=t at predetermined periods is stored in the frame buffer 402. Data stored in the frame buffer 402 before the data is input from the input terminal 401 to the frame buffer 402 is transferred to the frame buffer 403. Similarly, data stored in the frame buffer 403 is transferred to the frame buffer 404. Image data stored in the frame buffers 402, 403, and 404 are read out at a rate corresponding to the display frequency of the display device 104, and are respectively input to the multipliers 405, 406, and 407. Then, the image data are respectively multiplied with coefficients K0, K1, and K2 in these multipliers, and thereafter, the product data are added to each other by the adder 408. The output, given by the equation below, from the adder 408 is input to the image processing unit 103.

$$Fi = \sum_{i=0}^{i} KiUi \quad (2)$$

In the second embodiment, the time attenuation characteristics of an image to be displayed can be set as the Z transform (discrete Laplace transform) of the coefficients K0, K1, and K2.

When the values of the coefficients K0, K1, and K2 are increased, since the residual image components increase, the dynamic image to be displayed can be smoothed, while input image data is blurred.

The correlations between the current input image data and image data which are multiplied with the coefficients K0, K1, and K2 and are located at a spatially identical position normally become lower in the order of outputs U0, U1, and U2 from the frame buffers. For this reason, when the coefficients K0, K1, and K2 have the same value, the residual image effect is enhanced in the order of K0<K1<K2, while the coefficient K2 has the largest influence on the blur of an image.

In order to maintain the sharpness of an image (to minimize the blur), the ratio of previous image signal components U2 and U1, which have lower correlations with the current image, must be reduced. For this reason, when the coefficients are set to satisfy K0≧K1≧K2, a dynamic image having a good balance between the smoothness and blur of a dynamic image can be realized. Also, the coefficients K0, K1, and K2 can be independently changed depending on whether importance is placed on the smoothness of an image or the sharpness (blur) of an image in accordance with pertinent necessary conditions.

An example of the method of setting the coefficients K0, K1, and K2 when importance is placed on the sharpness of an image will be explained below.

Since the ratio of previous image signal components U2 and U1, which have lower correlations with the current image, must be reduced, the coefficient K0 is adjusted to smooth motions of an image to some extent, and thereafter, the coefficients K1 and K2 are finely adjusted. In this process, the smoothness of an image (the amount of residual image to be added) can be adjusted (selected) within an allowable range below the upper limit of the blur of an image.

Therefore, when the display device in which the frequency of output image data (displayed) is lower than that of input image data (to be displayed) is used, a dynamic image cannot have a smooth motion since frame data are thinned out due to a delay in the rewriting operation of a dynamic image. In order to solve this problem, when the values of the coefficients K0, K1, and K2 in FIG. 5 are independently and appropriately adjusted to increase/decrease the residual image components to be added, a required smoothness can be imparted to motions of an image displayed on the display device, and at the same time, balance between the smoothness and blur of an image due to the addition of the residual image can be arbitrarily controlled.

Note that the residual image forming unit of this embodiment sets optimal coefficients K0, K1, and K2 by recognizing the transfer rate (frequency) of input image data and the display frequency of the display device. The display frequency information of the display device can be input from the display device side to the residual image forming unit at a predetermined timing (e.g., upon power-ON).

The third embodiment of the residual image forming unit 109 will be described below.

Figure 6:
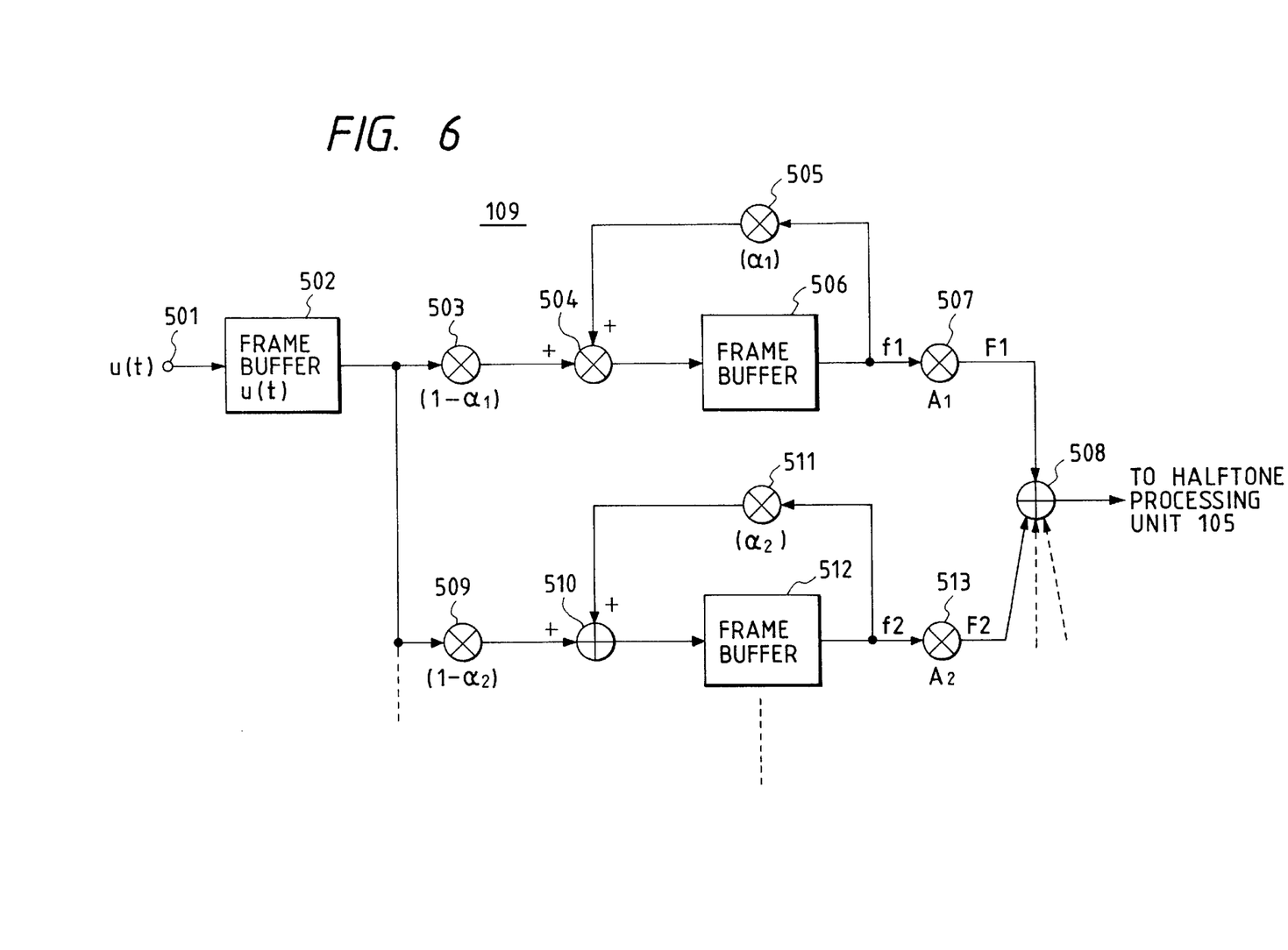
FIG. 6 is a block diagram showing the arrangement of a residual image forming unit 109 according to the third embodiment of the present invention.

FIG. 6 is a block diagram showing the arrangement of the residual image forming unit 109 according to the third embodiment of the present invention.

Referring to FIG. 6, the unit 109 comprises an input terminal 501 of digital image data u(t), frame buffers 502, 506, and 512, multipliers 503, 505, 507, 509, 511, and 513, and adders 504, 508, and 510.

The operation of the residual image forming unit with the arrangement shown in FIG. 6 will be described below.

Digital image data u(t) input from the input terminal 501 at time T=t at predetermined periods is stored in the frame buffer 502. The data stored in the frame buffer 502 is read out at a rate corresponding to the frame frequency of the display device 104, and the readout data is multiplied with coefficients $(1-\alpha_1)$ and $(1-\alpha_2)$ by the multipliers 503 and 509. The outputs from the multipliers 503 and 509 are input to the adders 504 and 510.

On the other hand, pixel data corresponding to an input signal at time T=t−1 are read out from the frame buffers 506 and 512, and are multiplied with coefficients $\alpha_1$, and $\alpha_2$ by the multipliers 505 and 511. The outputs from these multipliers 505 and 511 are added to the outputs (corresponding to pixel data at time T=t) from the multipliers 503 and 509 by the adders 504 and 510. The outputs from these adders 504 and 510 become the values in the frame buffers 506 and 512 at time T=t.

The image data are read out from the frame buffers 506 and 512 at the frame rate of the display device 104, and are multiplied with weighting coefficients $A_1$ and $A_2$ by the multipliers 507 and 513. Thereafter, the outputs from these multipliers 507 and 513 are added to the output from another residual image forming circuit having the same arrangement as that in FIG. 3 by the adder 508.

Note that circuits respectively consisting of the components 503 to 506 and the components 509 to 512 in FIG. 6 have the same function and effect as those of a circuit consisting of the components 203 to 206 shown in FIG. 3, except for their coefficients α.

The output from the adder 508 is input to the image processing unit 103, and after the halftone processing, the image data is displayed on the display device 104 shown in FIG. 2.

Outputs Fi(t) from the adders 507 and 513 and a display output F are respectively given by:

$$Fi = \alpha_i Fi(t-1) + (1 + \alpha_i)u(t) \quad (3)$$

$$F = \sum_{i=0}^{i} A_i Fi \quad (4)$$

In this embodiment, the time attenuation characteristics of image data (pixel data) to be displayed allows to arbitrary setting of the leading and trailing edges of signals and the weighting coefficient (attenuation component) of the output from each residual image forming unit having the same arrangement as that in FIG. 3 in accordance with the time constant determined by $\alpha_1$ and $\alpha_2$, and the weighting coefficients $A_1$ and $A_2$, and the entire circuit shown in FIG. 6 can freely set the time-level characteristics.

Figure 7A:
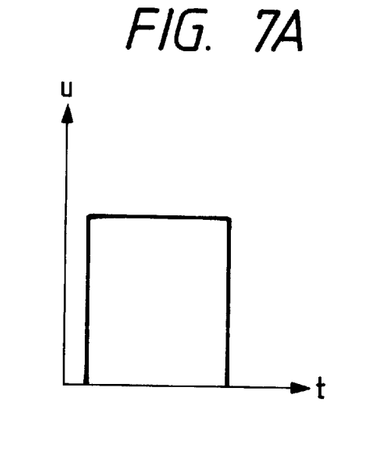
FIGS. 7A to 7C are charts showing examples of the time waveforms of input and output signals of the residual image forming unit in the third embodiment.
Figure 7B:
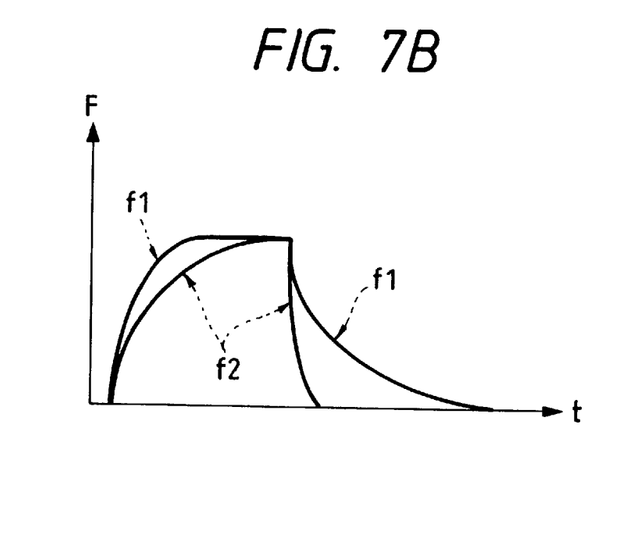
Figure 7C:
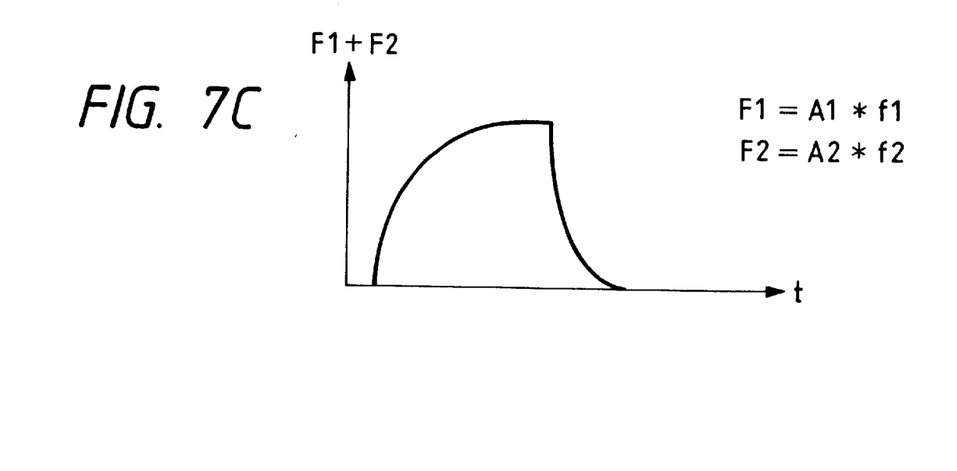

FIGS. 7A to 7C show an example of the attenuation characteristics of this embodiment shown in FIG. 6.

Assume that the value of the coefficient $\alpha_1$ is set so that the value of given image data on the frame buffer 506 shows a time change, as indicated by a curve f1 in FIG. 7B, and the value of the coefficient $\alpha_2$ is set so that the value of the image data on the frame buffer 512 shows a time change, as indicated by a curve f2 in FIG. 7B. In this case, when the value of the pixel data in the frame buffer 502 shown in FIG. 6 shows a time change, as shown in FIG. 7A, image data (f1, f2) read out from the frame buffers 506 and 512 are multiplied with the coefficients $A_1$ and $A_2$ by the multipliers 507 and 512, and thereafter, the product data are added to each other by the adder 508. As a result, the image data becomes a signal having residual image characteristics, as indicated by a curve (F1+F2) in FIG. 7C.

In this embodiment, a plurality of residual image forming circuits respectively consisting of the components 503 to 506 and the components 509 to 512 shown in FIG. 6, each of which circuits is the same as that shown in FIG. 3, are set, and their coefficients $\alpha_n$ (n: integer) are set to have independent residual image characteristics. In addition, the coefficient multipliers 507 and 513 in FIG. 6 and their multiplication coefficients $A_n$ ($0 \leq A_n \leq 1$, n: integer) are set at the outputs of the residual image forming circuits having the same arrangement as that shown in FIG. 3, so that the outputs from the residual image forming circuits can be added to each other after they are multiplied with arbitrary weighting coefficients, thereby broadening the range of variations of the residual image characteristics.

Therefore, by inserting the residual image forming unit shown in FIG. 6 before the image processing unit 103 in FIG. 2, since residual image characteristics can be formed by adding a plurality of residual image addition characteristics at an arbitrary ratio, the amount of residual image to be added (the time-level characteristics shown in FIGS. 7A to 7C) can be precisely adjusted. Thus, when the display device in which the frequency of output image data (displayed) is lower than that of input image data (to be displayed) is used, a dynamic image cannot have a smooth motion since frame data are thinned out due to a delay in the rewriting operation of a dynamic image. In order to solve this problem, by adding the residual image by the above-mentioned method, residual image addition (residual image time level) characteristics that can realize the visual smoothness of an image, and can minimize the blur of an image due to the addition of the residual image can be realized.

Note that the residual image forming unit of this embodiment sets optimal coefficients $\alpha$ and A by recognizing the transfer rate (frequency) of input image data and the display frequency of the display device. The display frequency information of the display device can be input from the display device side to the residual image forming unit at a predetermined timing (e.g., upon power-ON).

The fourth embodiment of the residual image forming unit 109 will be described below.

Figure 8:
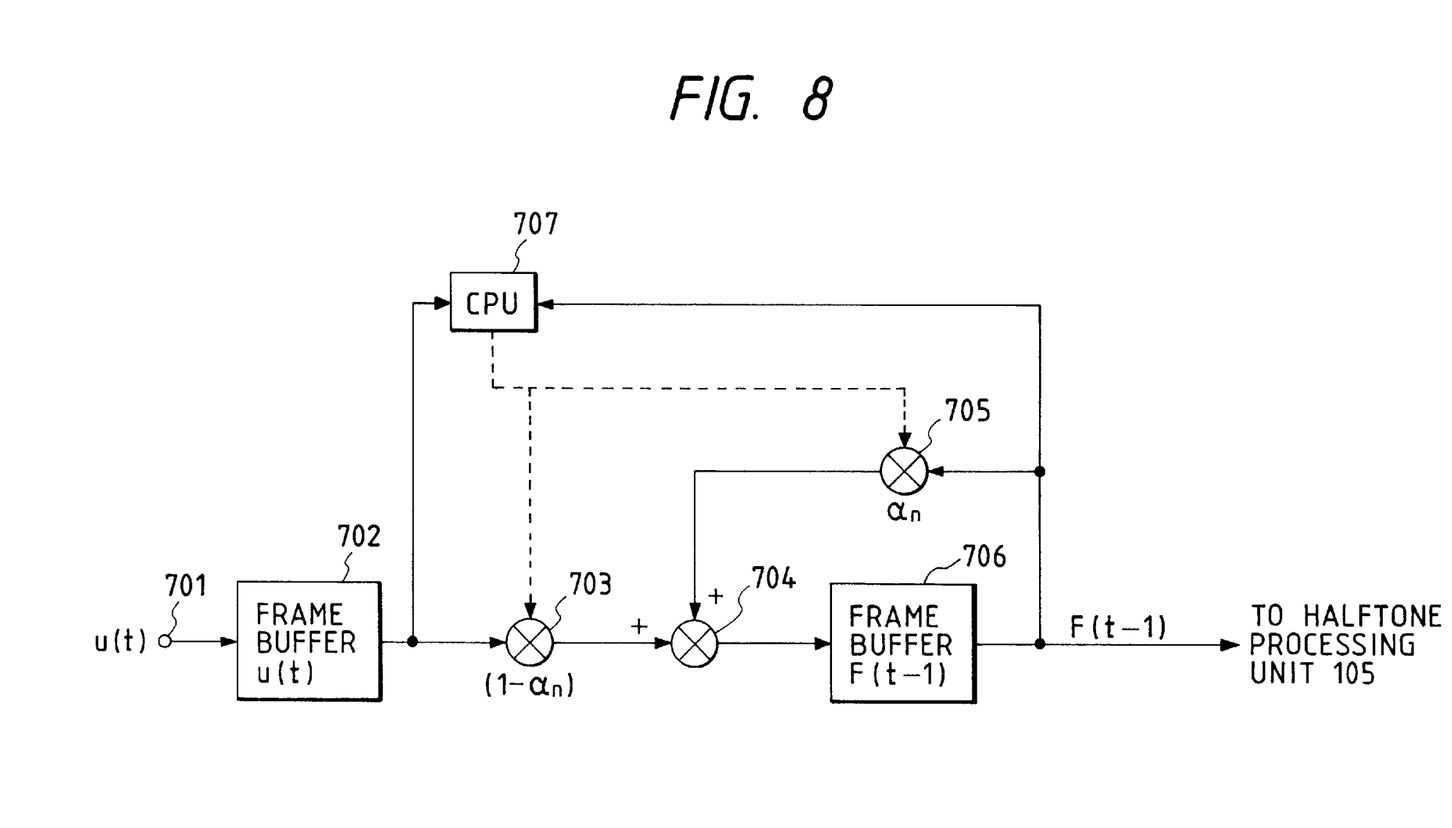
FIG. 8 is a block diagram showing the arrangement of a residual image forming unit 109 according to the fourth embodiment of the present invention.

FIG. 8 is a block diagram showing the arrangement of the residual image forming unit 109 according to the fourth embodiment of the present invention.

Referring to FIG. 8, the unit 109 comprises an input terminal 701 of digital image data u(t), frame buffers 702 and 706, multipliers 703 and 705, an adder 704, and a microcomputer 707 for controlling the value of a coefficient $\alpha_n$ by comparing input image data u(t) and the luminance signal component of a display output F(t).

The operation of the residual image forming unit with the arrangement shown in FIG. 8 will be described below.

A digital image signal u(t) (pixel data) input from the input terminal 701 at time T=t is temporarily stored in the frame buffer 702. The pixel data u(t) stored in the frame buffer 702 is sequentially read out and is multiplied with a coefficient $(1-\alpha_n)$ by the multiplier 703 (for $0 \leq \alpha_n < 1$). The output $(1-\alpha_n)u(t)$ from the multiplier 703 is input to the adder 704, and is added to a display output (residual image) corresponding to an input image signal at time T=t−1. The sum signal is stored in the frame buffer 706 as the latest display output. The pixel data stored in the frame buffer 706 is read out at a rate corresponding to the frame rate of the display device 104 shown in FIG. 2 as the display output corresponding to the input signal at time T=t, and is input to the image processing unit 103 and the multiplier 705. The display output corresponding to the input signal at time T=t input to the multiplier 705 is multiplied with a coefficient $\alpha_n$, and is added to a processing signal $(1-\alpha_n)u(t+1)$ corresponding to an input image signal at time T=t+1 (to add a residual image thereto).

When the above-mentioned processing is performed for the input digital image signal u(t), the microcomputer 707 discriminates the luminance signal levels of input and output signals u(t) and F(t) under the conditions given by formulas (6) and (7) below, and the value of the coefficient $\alpha_n$ is changed in accordance with the discrimination result, the amount of residual image to be added to the image signal u(t) to be displayed can be changed in correspondence with the input image.

$$F(t) = \alpha_n F(t-1) + (1-\alpha_n)u(t) \quad (5)$$

$$\downarrow$$

$$\alpha_n = \alpha_1 : (U_Y)_{ij} \geq (F_Y)_{ij} \quad (6)$$

$$\alpha_n = \alpha_2 : (U_Y)_{ij} < (F_Y)_{ij} \quad (7)$$

where
$U_Y$: luminance component of input digital image signal
$F_Y$: luminance component of (processed) digital image signal output from residual image forming unit More specifically, since the trailing and leading edge curves of an image to be displayed can be changed in correspondence with the input image signal, the trailing and leading edge curves of an image to be displayed can be changed in correspondence with an image signal.

Figure 9A:
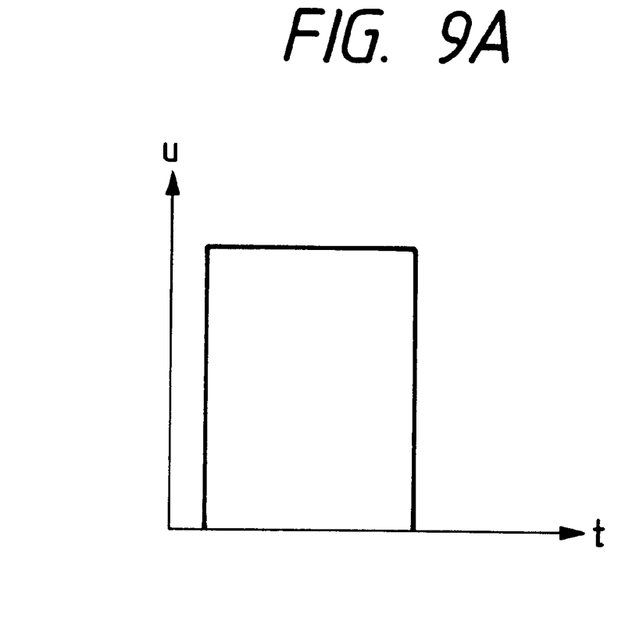
FIGS. 9A and 9B are charts showing examples of the time waveforms of input and output signals of the residual image forming unit in the fourth embodiment.
Figure 9B:
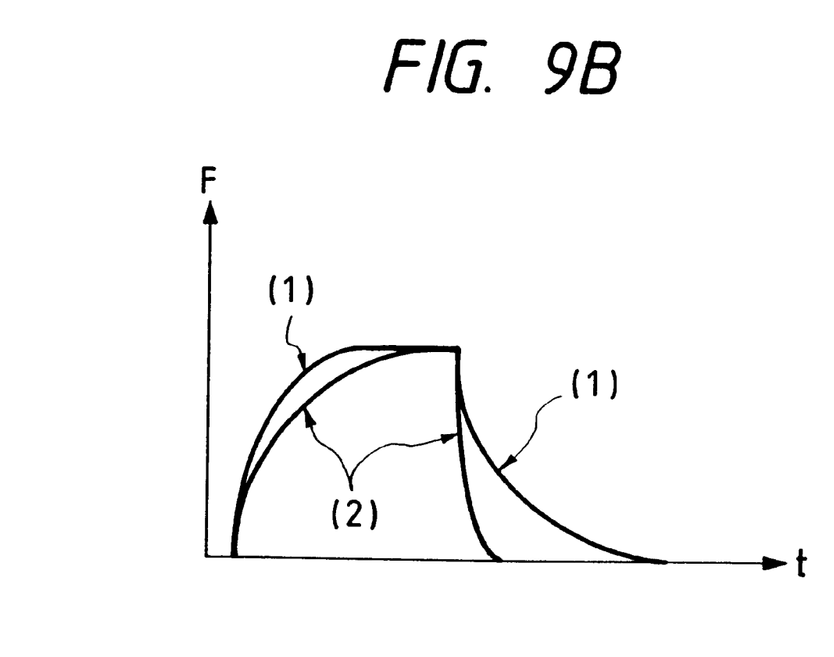

For example, when the value $\alpha_n$ is selected under the conditions given by formulas (6) and (7) above for $\alpha_1 < \alpha_2$, the input digital image signal can be frequency-converted, so that the leading edge of an image is defined by a steeper curve, and its trailing edge is defined by a slower curve, as shown in FIGS. 9A and 9B. In FIG. 9B, (1) indicates the output time waveform when $\alpha_n$ satisfies $\alpha_1 < \alpha_2$, and (2) indicates the output time waveform when $\alpha_n$ satisfies $\alpha_1 > \alpha_2$.

Note that the time level (residual image addition) characteristics of F(t) with respect to the value $\alpha_n$ of the residual image forming unit shown in FIG. 8 are the same as those of F(t) with respect to the value $\alpha$ in the residual image forming unit (FIG. 3) of the first embodiment.

Therefore, the value $\alpha$ can be arbitrarily changed in units of pixels (highest resolution) in correspondence with the level u(t) of an input image and the output level F(t−1) of the residual image forming unit. As a consequence, when the display device in which the frequency of output image data (displayed) is lower than that of input image data (to be displayed) is used, a dynamic image cannot have a smooth motion since frame data are thinned out due to a delay in the rewriting operation of a dynamic image. In view of this problem, residual image addition (residual image time level) characteristics that can realize the visual smoothness of an image by adding a residual image, and can minimize the blur of an image due to the addition of the residual image can be realized.

Note that various changes and modifications of the present invention may be made without departing from the spirit and principal features of the invention.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus comprising:
   a) input means for inputting image data at a first frame rate; and b) processing means for adaptively weighting adjacent image data of a frame adjacent to the frame of the input image data to generate residual image data and adding the residual image data to the input image data, wherein said processing means comprises output means for outputting the processed image data at a second frame rate, the first frame rate being larger than the second frame rate, and wherein said processing means adaptively weights the adjacent image data according to the second frame rate.

2. An apparatus according to claim 1, further comprising:

display means for displaying image data output from said output means.

3. An apparatus according to claim 2, wherein said display means has a display frequency corresponding to the second frame rate.

4. An apparatus according to claim 2, wherein said display means comprises a ferroelectric liquid crystal display.

5. An apparatus according to claim 4, wherein said display means updates displayed data by a partial rewriting operation.

6. An apparatus according to claim 1, wherein said processing means comprises:

a) multiplier means for independently multiplying the image data and adjacent image data adjacent to the image with coefficients; and b) adder means for adding the image data and the adjacent image data multiplied by said multiplier means.

7. An apparatus according to claim 1, wherein said processing means comprises:

a) first storage means for storing the input image data;

b) first multiplier means for multiplying the image data output from said first storage means with a first coefficient;

c) second storage means for storing image data;

d) second multiplier means for multiplying the image data output from said second storage means with a second coefficient; and e) adder means for adding the image data output from said first and second multiplier means.

8. An apparatus according to claim 7, wherein the image data stored in said second storage means is image data output from said adder means.

9. An apparatus according to claim 8, wherein said output means outputs the image data output from said second storage means.

10. An apparatus according to claim 7, wherein the image data stored in said second storage means is image data output from said first storage means.

11. An apparatus according to claim 10, wherein said output means outputs image data output from said adder means.

12. An apparatus according to claim 1, wherein said processing means comprises:

a) a plurality of storage means for sequentially transferring image data input by said input means;

b) a plurality of multiplier means for multiplying outputs from said plurality of storage means with predetermined coefficients; and c) adder means for adding the outputs from said plurality of multiplier means.

13. An apparatus according to claim 12, wherein said output means outputs image data output from said adder means.

14. An image processing apparatus comprising:

a) input means for inputting image data;

b) processing means for adaptively weighting adjacent image data of a frame adjacent to the frame of the input image data to generate residual image data and adding the residual image data to the input image data; and c) display means for displaying the input image data processed by said processing means, wherein a display frequency of said display means is lower than a frequency of the image data input by said input means, and wherein said processing means adaptively weights the adjacent image data according to the display frequency.

15. An apparatus according to claim 14, wherein said display means comprises a ferroelectric liquid crystal display.

16. An apparatus according to claim 15, wherein said display means updates displayed data by a partial rewriting operation.

17. An image processing method comprising:

a) an input step of inputting image data at a first frame rate; and b) a processing step of adaptively weighting adjacent image data of a frame adjacent to the frame of the input image data to generate residual image data and adding the residual image data to the input image data, wherein said processing step comprises an output step of outputting and processed image data at a second frame rate, the first frame rate being larger than the second frame rate, and wherein adaptive weighting in said processing is performed according to the second frame rate.

18. An image processing method comprising:

a) an input step of inputting image data;

b) a processing step of adaptively weighting adjacent image data of a frame adjacent to the frame of the input image data to generated residual image data and adding the residual image data to the input image data; and c) a display step of displaying the image data processed by said processing step, wherein a display frequency of said display step is lower than a frequency of the image data input by said input step, and wherein adaptive weighting in said processing is performed according to the display frequency.

* * * * *

UNITED STATES PATENT AND TRADEMARK OFFICE
CERTIFICATE OF CORRECTION

PATENT NO.   : 6,008,790
DATED        : December 28, 1999
INVENTOR(S)  : TOSHIAKI SHINGU ET AL.

It is certified that error appears in the above-identified patent and that said Letters Patent is hereby corrected as shown below:

COLUMN 6:

Line 40, "to" should be deleted.

COLUMN 10:

Line 48, "generated" should read --generate--.

Signed and Sealed this

Third Day of April, 2001

Attest:

NICHOLAS P. GODICI

*Attesting Officer*   Acting Director of the United States Patent and Trademark Office